United States Patent [19]

Fogerson

[11] Patent Number: 4,750,995

[45] Date of Patent: Jun. 14, 1988

[54] STARCH SEPARATION OF POTATO STRIPS

[75] Inventor: Richard D. Fogerson, Ontario, Oreg.

[73] Assignee: Ore-Ida Foods, Inc., Boise, Id.

[21] Appl. No.: 901,278

[22] Filed: Aug. 28, 1986

Related U.S. Application Data

[63] Continuation-in-part of Ser. No. 690,629, Jan. 11, 1985, abandoned.

[51] Int. Cl.⁴ .......................... B03B 5/30; B03B 5/28
[52] U.S. Cl. .................................. 209/173; 209/17; 209/18
[58] Field of Search ................... 209/12, 18, 156, 157, 209/172.5, 173, 17

[56] References Cited

U.S. PATENT DOCUMENTS

| | | | |
|---|---|---|---|
| 567,790 | 9/1896 | O'Neill | 209/173 |
| 1,069,143 | 8/1913 | Keene | 209/173 |
| 1,643,596 | 9/1927 | Zuckerman | 209/173 |
| 1,677,015 | 7/1928 | Benton | 209/173 |
| 1,754,923 | 4/1930 | Wiegand | 209/173 |
| 1,835,634 | 12/1931 | Chapman | 209/173 |
| 1,866,965 | 7/1932 | Clement | 209/173 |
| 2,139,047 | 12/1938 | Tromp | 209/173 |
| 2,320,335 | 6/1943 | Bauer | 209/173 |
| 2,359,414 | 10/1944 | Frova | 209/173 |
| 2,422,657 | 6/1947 | Cleveland | 209/458 |
| 2,426,398 | 8/1947 | Lathrop | 209/173 |
| 2,571,056 | 10/1951 | Olney | 209/173 |
| 2,578,808 | 12/1951 | Johnson et al. | 209/173 |
| 2,603,352 | 7/1952 | Tromp | 209/173 |
| 2,616,564 | 11/1952 | Schrock | 209/173 |
| 2,681,285 | 6/1954 | Hendel et al. | 209/173 |
| 2,698,087 | 12/1954 | Call et al. | 209/158 |
| 2,828,860 | 4/1958 | Morris | 209/3 |
| 2,879,889 | 3/1959 | Rakowsky | 209/173 |
| 3,235,072 | 2/1966 | Nelson | 209/172.5 |
| 3,246,750 | 4/1966 | Chase | 209/12 |
| 3,247,961 | 4/1966 | Chase | 209/12 |
| 3,282,417 | 11/1966 | Chase | 209/12 |
| 3,702,656 | 11/1972 | Gutterman et al. | 209/173 |
| 3,869,559 | 3/1975 | Clark | 426/481 |
| 4,036,664 | 7/1977 | Priebe | 209/173 |
| 4,169,787 | 10/1979 | Gunnerson | 209/173 |
| 4,251,895 | 2/1981 | Caridis et al. | 15/313 |
| 4,375,264 | 3/1983 | Porter | 209/606 |
| 4,461,645 | 7/1984 | Roth et al. | 106/100 |

OTHER PUBLICATIONS

"Ridley-Scholes Coal Washington System", Mitchell Engineering Limited, Sec. 1947.
United States Standards for Grades of Frozen French Fried Potatoes, 2/8/67.
Wastewater Engineering: Treatment Disposal; Reuse, Metcalf & Eddy, Inc., 1979, 1972.

Primary Examiner—Kenneth M. Schor
Assistant Examiner—Thomas M. Lithgow
Attorney, Agent, or Firm—Burns, Doane, Swecker & Mathis

[57] ABSTRACT

A process and apparatus for separating cut potato strips such as french fries having varying solids content. By the process the cut potato strips are introduced into a starch suspension having a specific gravity intermediate that of the potatoes so that the strips of low solids content rise to the top of the suspension and the high solids strips settle to the lower region of the suspension. The apparatus comprises a tank containing the suspension which tank has a sloping bottom and an upper and lower conveyor. The upper conveyor removes the low solids strips and the lower conveyor removes the heavy solids strips and is equipped with flights that scrape the sloping bottom end wall of the tank to prevent starch accumulation therein.

6 Claims, 6 Drawing Sheets

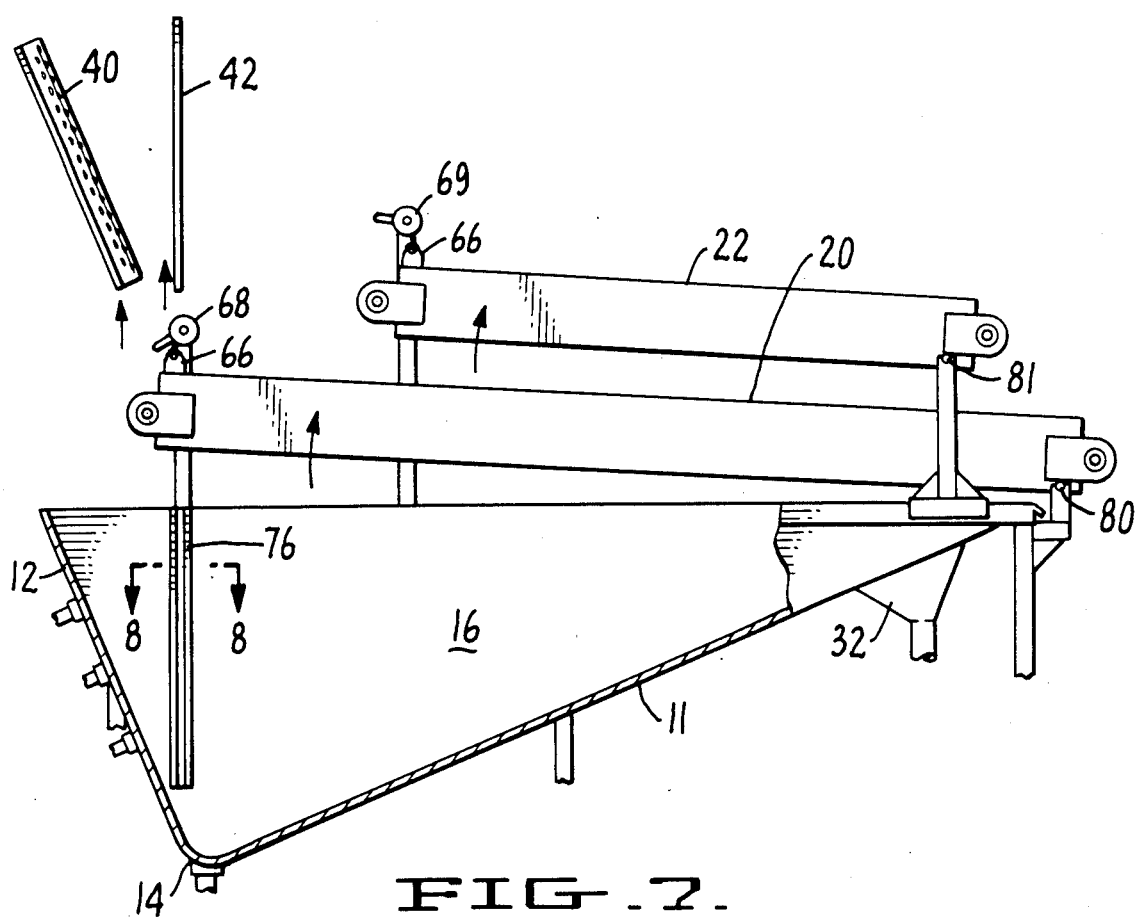
FIG. 7.
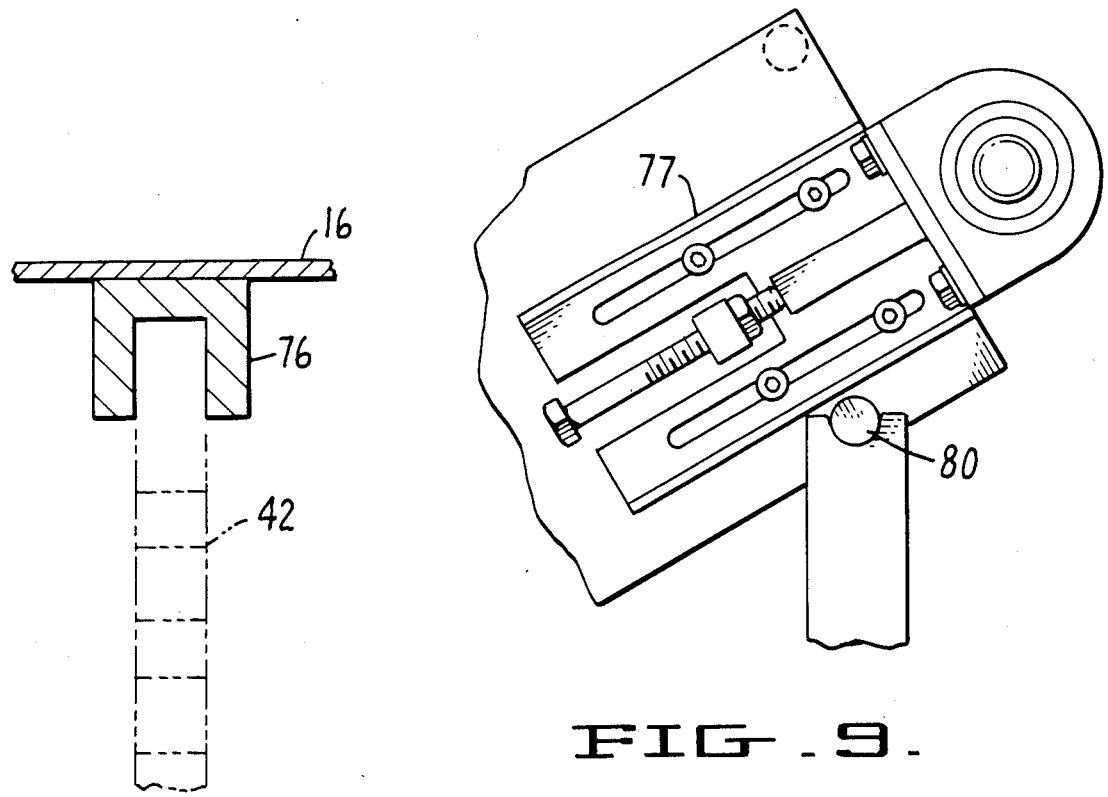
FIG. 8.
FIG. 9.

STARCH SEPARATION OF POTATO STRIPS

This application is a continuation-in-part of Ser. No. 690,629 filed Jan. 11, 1985 for Starch Separation of Potato Strips (now abandoned).

This invention relates to a process for separating low solids potato strips of a given density from high solids higher density potato strips utilizing a starch suspension as the separating medium to thereby recover a high density potato strip for improved texture and color uniformity.

BACKGROUND OF THE INVENTION

Potatoes of the shape, size and quality normally useful for cutting into strips of the french-fry configuration are composed of, on the average, approximately 20% solid matter and 80% water. However, these potatoes typically vary in solids content from one another by as much as 5 to 6% or more. In addition, within any given potato, the solids content will vary significantly from the high moisture central core to the low moisture exterior. Thus, when potatoes are cut into strips, the strips are characterized by a wide variation in solids content depending on the particular potato and the part of the potato from which they are cut. Subsequent uniform frying of the strips from such a potato or quantity of potatoes results in products of varying texture and otherwise non-uniform results. Other non-uniform results include a condition known as "sugar ends" or "whole sugar units". This extremely undesirable condition occurs when either one end of the cut strip or the entire strip is high in sugars. Upon frying, that end or unit becomes very dark and the occurrence of even minor amounts of these units can result in the product being treated as out of grade. These units are removed by solids separation because the high sugar portion is of low specific gravity.

Tonnage production of such fried strips where uniform results are requisite is thus extremely difficult to achieve. The art has long recognized the problem and has coped with it by simply overprocessing the high solids strips (highest quality) to ensure that the low solids strips (lowest quality) are adequately blanched and fried to the minimum level of cooking in the widely varied density mixture.

Since the solids content of a potato or potato part varies directly with its density or specific gravity, a practical process for separating the potato strips by solids content is desirable. For example, a potato strip with an average solids content of 20% may have a specific gravity of about 1.080. Therefore, potato strips with a solids content of less than 20% can be removed from higher solids strips by placing the strips in a liquid medium of 1.080 specific gravity and removing all strips that float and recovering the high solids strips for french fry use having an improved and acceptable texture.

It can therefore be seen that a process for segregating raw potato strips according to solids content (density) is potentially useful for producing a more uniform quality product. Also, one main economic advantage of the process lies in the fact that more optimum processing conditions (blanching and frying) leads to reduced energy requirements, reduced oil consumption, and improved overall product yield. Improved yield means that more saleable and hence profitable finished product is obtained for the same amount of raw product processed because of the uniform nature of the process and the better quality product by a lower cost operation.

The separation of cut potato strips into categories has also been proposed heretofore. U.S. Pat. No. 2,681,285 to Hendel et al is directed to a process of segregating potato tissue wherein the cut potatoes are subjected to density fractionation in a solution to isolate denser pieces having low browning tendencies as part of a process for preserving the brine solution prepared by dissolving common salt in water to produce a solution having a specific gravity in the range from about 1.060 to about 1.090. The potato pieces which sink and the potato pieces which float are separately removed. Mention is made that other non-toxic solutions of the proper specific gravity may be used instead of the brine solution Specific mention is made of calcium chloride, potassium chloride, sucrose and dextrose. All such separating media are in the form of solutions and not suspensions and although starch was available in large quantities at low cost at the time Hendel's invention, in 1952 the advantages thereof such as low processing costs and low material costs to produce a suspension to facilitate fractional separation was not recognized.

Basically, Hendel desires to separate the tissue of high browning tendency from the tissue of low browning tendency. In any event, the process utilizes a solution, be it a brine or one of the other solutes intended to produce a fractionating medium and not a suspension as contemplated by the present invention.

Although described as non-toxic, brine solutions and many of the other materials mentioned may be hazardous to the environment. Further, the residual salt left in the treated potato products represents an undesirable product for consumers. For various reasons, this particular proposal has not been successful and is not used commercially.

U.S. Pat. No. 2,426,398 to Lathrop discloses a method and apparatus for grading whole potatoes which also utilizes a brine solution of predetermined density. According to the patent, potatoes of higher specific gravity and greater density sink in the brine solution while potatoes of lighter specific gravity float at the surface of the solution and are skimmed off and removed. The process can be repeated with solutions of varying specific gravity so that the steps are repeated as many times as necessary for the number of grades of potatoes desired to be recovered. However useful such a process may be, it is only an arrangement for grading potatoes and does not disclose the separation of the parts cut from a given potato preparatory to freezing, frying or other processing steps, and wherein such parts have variations in density or solids content.

Several types of special separating equipment that employ conveyors which move potato strips and different grades of potatoes and other products after they have been separated by classification in a sink-float type of separator have been proposed in the art. Such equipment is disclosed in Lathrop U.S. Pat No. 2,426,398 and Olney U.S. Pat. No. 2,571,056. However useful such a process may be, in each instance the arrangements of conveyors and tanks are unique to the particular separating system to which the patents are directed and not useful in other systems and hence are not able to produce the results of the present invention.

One such patent of interest is Gunnerson U.S. Pat. No. 4,169,787 to a method and apparatus for separating raisins from the stems, caps, mold and other inedible portions thereof. It employs a complicated set of hipped discharge conveyors that receive two fractions of the treated materials, one being the edible raisins and the other portion being the inedible materials, after their separation by a solution utilizing differential specific gravity. The separation of Gunnerson is relatively easy because there is a relatively large gap in specific gravity between the two dissimilar materials, namely, raisins and inedible trash. In separating low and high solids strips, it is necessary to deal with a specific gravity continuum of like materials and therefore, control of the entire process must be much more precise and the equipment must be more sophisticated in design.

Despite the fact that starch is present in many potato producing operations, there is no prior teaching of the use of starch as a solid suspension medium for separation. U.S. Pat. No. 567,790 to O'Neill discloses separating and collecting the germs from corn. A starch liquor is formed from the corn as it is ground in water and subjected to pressure and disintegrating steps. However, the starch medium is not used as a separation media and its specific gravity is not relied on because corn germ floats in plain water without the addition of a medium such as sodium chloride or starch and to a large extent the separation is effected by mechanically agitating the hulls to cause them to rise to the top of the starch liquor as the solids pass to a sieve. The starch liquor is thus not necessary for this to operate as a sink-float separation medium.

SUMMARY OF THE INVENTION

The present invention is to a process wherein cut potato strips of varying solids content are introduced into a starch suspension that is controlled at a desired specific gravity and under other flow conditions whereby turbulence is adjusted to avoid settling of the starch and yet permit the high solids potato strips to sink to the bottom of the vessel or tank in which the process is carried out while the low solid strips of higher moisture content float near the top of the suspension.

A particularly advantageous apparatus for carrying out the process is one wherein a meshed lower conveyor is disposed adjacent the sloping bottom area of the separating tank and extends upwardly to a discharge zone and is adapted to receive and discharge the fraction of high solids potato strips as they settle through the starch suspension. The lighter low solids strips remain in the top area of the starch suspension and float to an upper meshed conveyor belt positioned within the tank so that one of its ends extends into the starch medium at a point slightly below the lower level of such floating potato strips in the starch suspension medium. The upper conveyor slopes upwardly and extends out of the tank at its opposite end whereby the low solid strips can be discharged from the tank. Thus, the low solids strips of high moisture content are recovered separately for uses independent of those to which the high solids strips are utilized.

The use of a suspension medium comprising a starch suspension of a specified range of specific gravity is one of the important features of the invention. Although starch has been employed for many purposes, its use as a separating medium for cut potatoes is novel. As long as cut potatoes have been handled in water solutions it has been recognized that starch was present. Nevertheless, it has been and continues to be the general practice to treat the starch containing materials as a waste product to be discarded. The art never considered that it could be recovered in a form where it could be used as a separating medium for the very products from which it was produced. Accordingly, its use for that purpose and particularly within the range specified herein, is one of the main features of this invention.

One form of starch that is particularly useful is raw potato starch. It has excellent biological characteristics and mechanical stability that gives it resistance to breaking down at the conditions employed in the process and permit its recovery for reuse. Additionally, its ease of handling in standard waste treatment facilities poses no environmental concern. It is present in abundance in potato processing facilities and due to its non-toxic character it is an additive that does not have to be declared in the product lable.

One very useful source of raw potato starch is the flume water that is generated in a plant which is cutting and processing potato parts such as french-fried potato strips. Although such solutions are quite dilute, they can be readily concentrated and thereafter mixed with water to obtain a solution of the desired specific gravity, usually 1.040 to 1.090. One very useful method of effecting concentration of the starch slurry is by centrifugal separation in a hydraulic cyclone separator as is well known to those skilled in the art.

The process thus enjoys the advantages of recovering separate fractions of potatoes wherein the potatoes of each fraction are within a substantially narrower solids range. Accordingly, when strips in the french-fry form and the like are cooked they are of a more uniform solids content. In most instances the moisture content of the low solids strips precludes their effective use in french-fry applications so that they are independently recovered and sent for use in alternate potato products (e.g., hash browns) wherein the higher level of moisture makes no significant difference. Accordingly, the advantages of eliminating the low solid potato strips to permit optimizing the processing conditions for high solid potato strips is realized. Cooking is more efficient because of the more optimum cooking conditions at lower frying times. Cooking oil consumption is reduced and energy consumption is reduced. If provided for, however, even the low solids strips might be sent to a separate process line dedicated and operated at conditions optimum for producing acceptable quality fries from low solids strips From the foregoing it is seen that it is not only possible to use low solids potatoes, but also there is more versatility in that it is possible to use potatoes from a variety of sources. This is advantageous because at times during the processing season, insufficient potatoes of acceptable quality can be obtained.

The invention will be more readily understood by reference to the accompanying drawings identified below which show the type of vessel that is employed and the other special equipment which is useful in carrying out the particular process steps of the invention.

THE DRAWINGS

FIG. 7 is a schematic view of the conveyor belts used in the invention and shows them in position where they are raised from the tank for servicing and also shows the position of the flow distributor for the separating medium.

FIG. 8 is a fragmentary sectional view along the line 8—8 of FIG. 7 looking in the direction of the arrows.

FIG. 9 is a fragmentary view of the hinged joint as employed at the discharge ends of the upper and lower conveyor belts.

DETAILED DESCRIPTION OF THE INVENTION

Figure 1:
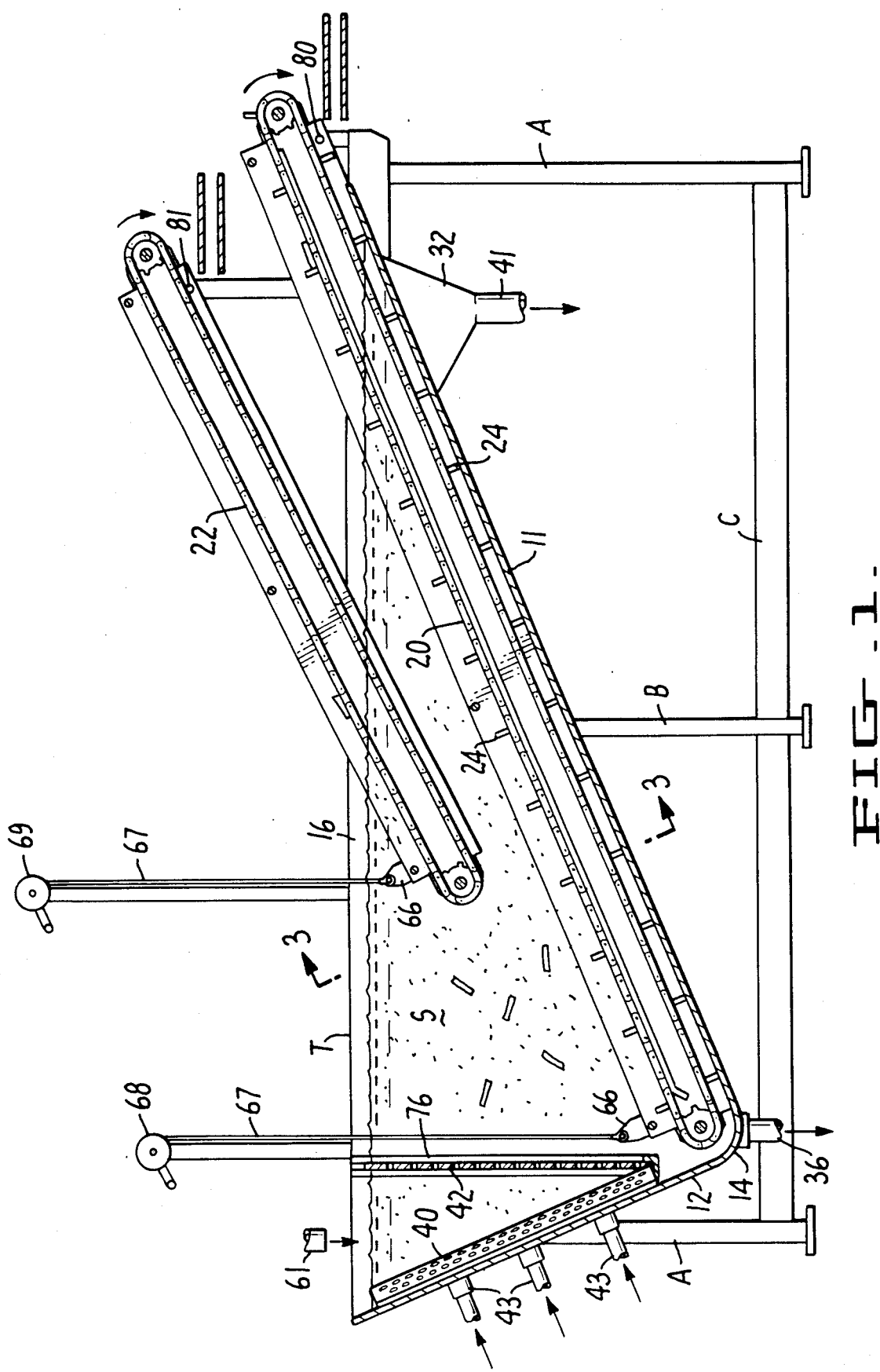
FIG. 1 is a cross-sectional view of the tank utilized in carrying out the invention, including the upper and lower discharge conveyors for removing the different types of potato cuts.
Figure 3:
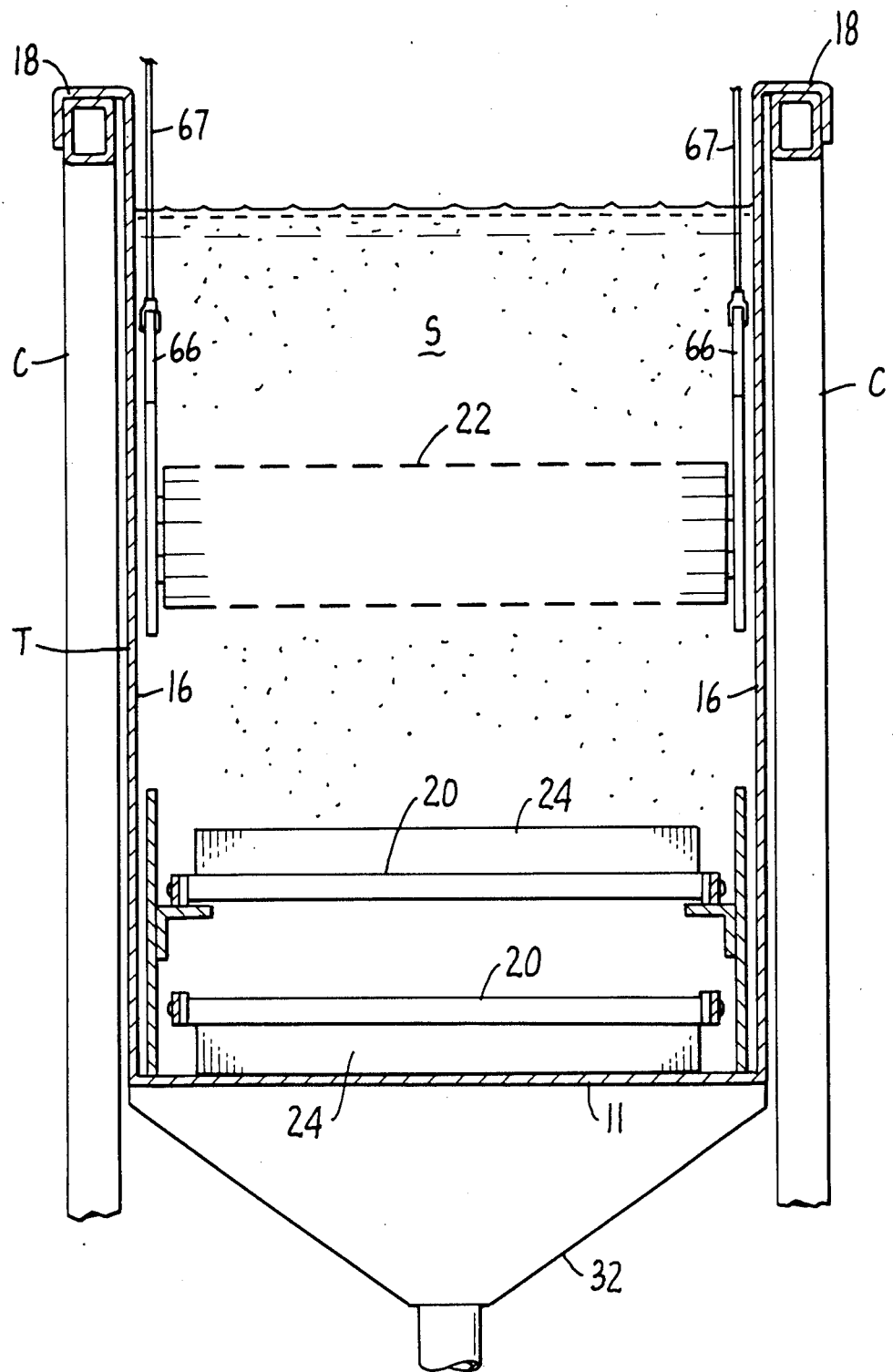
FIG. 3 is a sectional view through the tank of FIG. 1 taken along line 3—3 looking in the direction of the arrows.

As will be noted from FIG. 1, the separation process is carried out in a tank or vessel T containing a starch suspension S. Tank T is designed to have a sloping bottom 11 approximating about 30°-40° from the horizontal and extending from the lowest point 14 of the tank to the top region above the surface of the suspension. The other end wall 12 of the tank may be vertical or slightly inclined. The side walls 16 of the tank are vertical In the construction of tank T it is to be noted (FIG. 1) that the tank is supported by a frame structure comprising upright vertical frames A at each corner at the ends of tank T and vertical frames B at mid-points along the length thereof. Horizontally disposed frame members C extend to vertical supports A along the length of tank T at the base and at the top thereof along each side of tank T and at its ends. Such arrangement as so described and as shown in FIG. 1 is an advantageous structure but it is to be understood any useful arrangement for supporting tank T is satisfactory. Tank T in one useful form comprises a shell-like structure formed by walls 11, 12 and 16 of stainless steel or plastic or like material that is impervious to starch suspension S. The top 18 of the walls of the tank shell are formed into inverted U-shape form (See FIG. 3) that nest on the upper horizontal frames C to support tank T.

A porous or open mesh continuous conveyor belt 20 is placed adjacent the bottom 11 of the tank T and extends from a point above the level of the suspension. A second open mesh conveyor belt 22 is placed in the tank in theupper region of the starch suspension and extends in the embodiment herein about half the length of tank T.

The conveyor belts 20 and 22 are of open mesh or woven design and of an impervious stainless steel or plastic material through which the starch suspension can readily pass. (See FIGS. 5 and 6). Lower or bottom belt 20 has several upstanding flanges or flights 24 that extend to more readily engage the potato strips which they convey out of the tank T. Each of belts 20 and 22 move in the direction of the arrows and are approximately the width of tank T between sidewalls 16 (See FIG. 2). This is particularly important in the case of the bottom belt 20 so that its flights 24 can move along a path flush with the sloping wall 11 and sweep the bottom of tank T. Both belts 20 and 22 are pivoted or hinged at 80 and 81, respectively, at their upper discharge ends so that they can be readily lifted to remove them from the suspension medium S for cleaning and other maintenance as shown in FIG. 7 and described hereinafter. Each of belts 20 and 22 is also operated by a separate electric motor or other conventional means (not shown) and is capable of operating at speeds independent of the other. Normally, the lower conveyor belt 20 operates at a higher speed that the upper belt 22 because it is designed to and normally does remove a substantially greater amount of product. Also, because of its location at the bottom of tank T, belt 20 with its projecting flights 24 is less likely to cause objectionable turbulence within the separation zone of the starch suspensions as will be further discussed.

The tank T has a media discharge opening 32 at a point in the upper area of the sloping bottom wall 11. This enables the suspension medium S to be drained from and recirculated back into tank T with the aid of pump 44, FIG. 10, to maintain the flow of starch medium S through the tank as it flows from end wall 12 into the rear zone through the tank depth, past the potato charging zone and the area thereof adjacent the discharge zone at the top of sloping bottom 11. This arrangement assists in keeping the starch medium S in suspension while moving product through the tank in a stream flow toward the discharge end while providing an opportunity to cool the starch stream through a heat exchanger. Also, pump 34 and drain 36 at the very lowest point 14 of tank T aid in recirculating the starch solution S. Outlet 38 is provided at the separation zone in the upper region of tank T, and adjacent to the product feed zone, to remove samples of the suspension medium S for testing from which it can be determined whether it is necessary to add water or starch so as to maintain the desired specific gravity of the starch suspension. The arrangement for carrying out these steps is disclosed in FIG. 10, as described hereafter in more detail.

Figure 10:
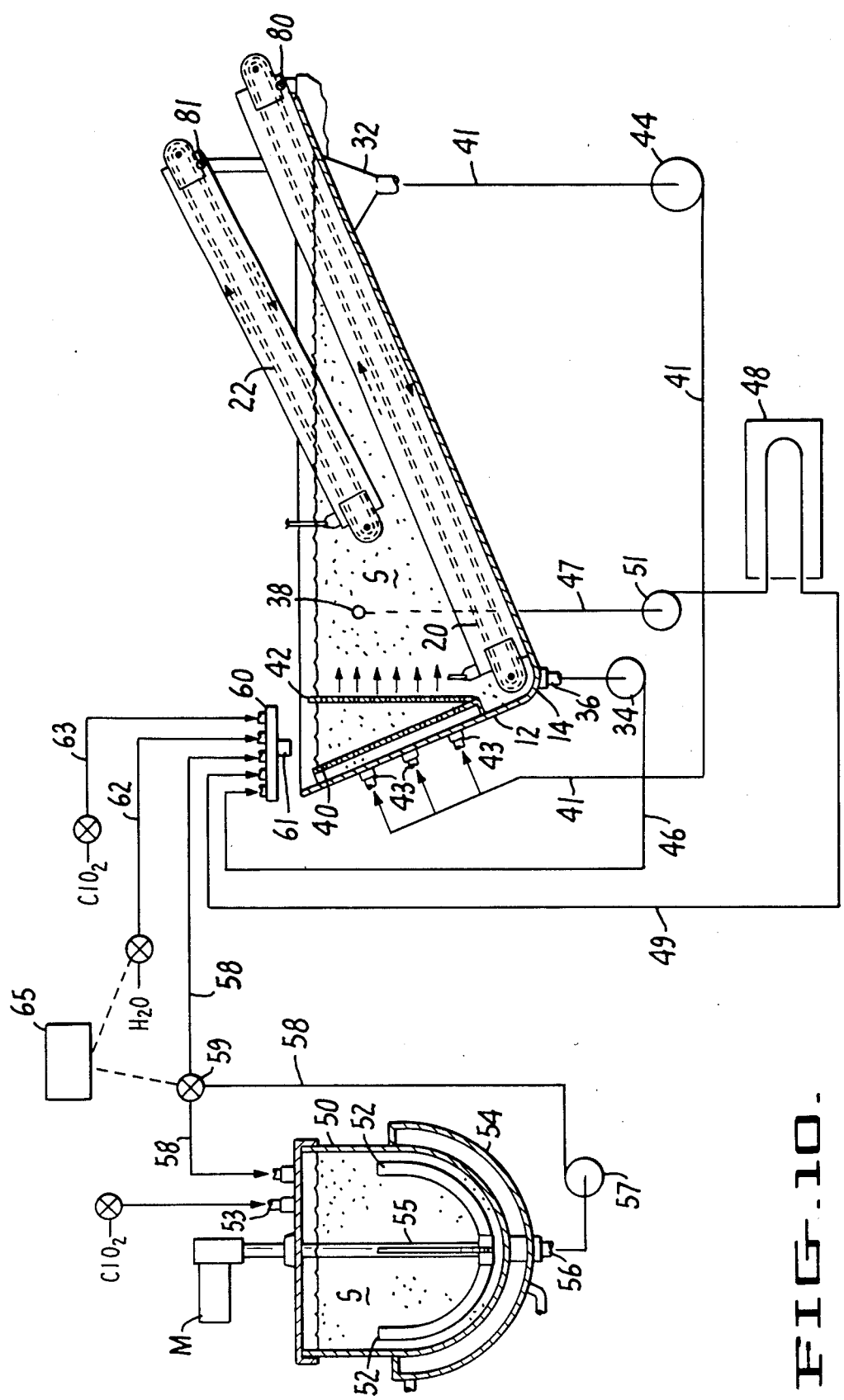
FIG. 10 is a view partly in section of the separating tank discharge systems for the separating medium employed in the invention.

One useful method of preparing the starch solution is disclosed in FIG. 10 where a vessel 50, having rotatable mixing paddles 52 for blending concentrated starch and liquid to the desired specific gravity. Motor M and shaft 55 are provided to actuate paddles 52. A cooling jacket 54 surrounds a portion of the tank to assist in maintaining the starch temperature at a desirable low level. A chlorine compound such as chlorine dioxide may be introduced into the starch in vessel 50 through feed pipe 53 or the like to inhibit bacteria growth in the solution.

Starch suspension S as so prepared in vessel 50 is withdrawn therefrom through outlet 56 and with the aid of pump 57 passes through line 58 and by proper adjustment of valve 59 by specific gravity controller 65 flows on into suspension medium feed manifold 60 and is fed directly to tank T through feed outlet 61. When no makeup starch is needed, valve 59 may be adjusted to recirculate the suspension medium S directly back to vessel 50. Also, water is added by controller 65 as needed and is fed directly to tank T through line 62, manifold 60, and outlet 61.

Figure 2:
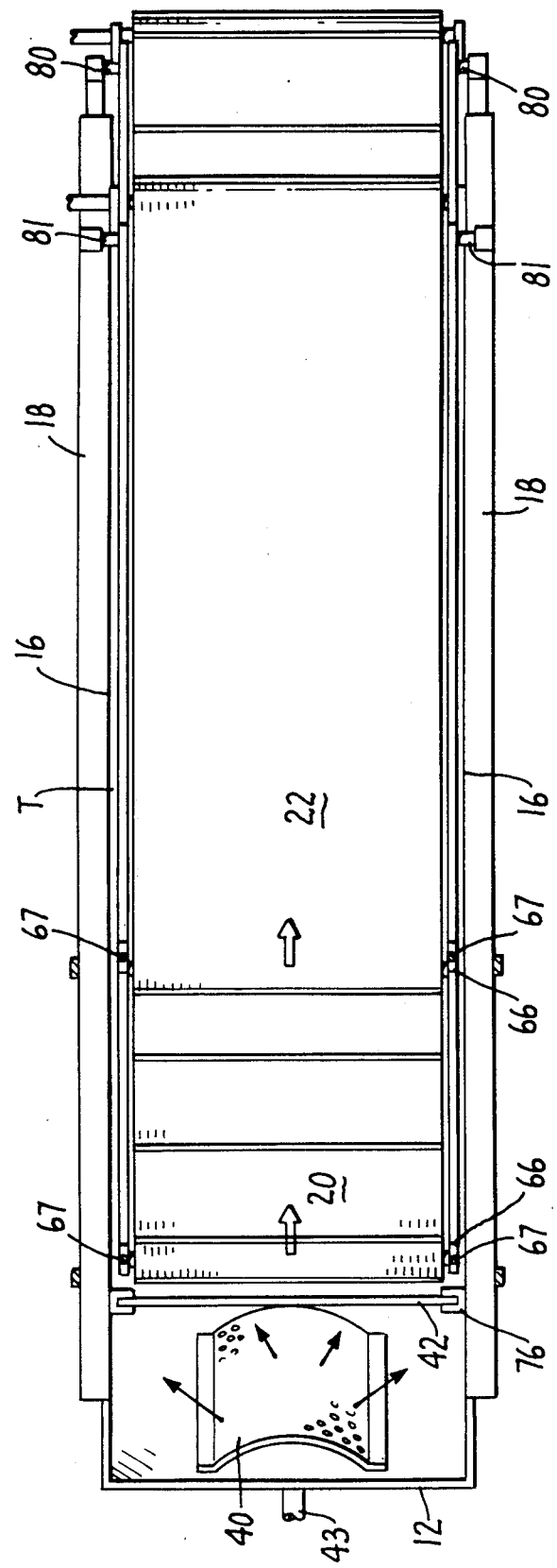
FIG. 2 is a top plan view of the tank and other equipment shown in FIG. 1.

Starch suspension S that is drained from tank T at 32 in the upper region thereof adjacent the cut potato discharge end is recirculated by means of pump 44 through line 41 (FIG. 10) into a plurality of pipes 43 running along the back wall 12 of the tank and extending from adjacent the top of wall 12 through the depth of tank T. Pipes 43 serve as the feed means for starch medium S that is fed through wall 12 and subsequently the radial diffuser plate 40 and into and across tank T. Radial plate 40, also extends the depth of wall 12 so that the solution comprising suspension S is introduced in radial flow at uniform rates through the depth of the tank. Perforated plate 42 within tank T adjacent to plate 40 approximates the depth of perforated plate 40 and further diffuses the flow of medium S. Flat plate diffuser 42 changes the radial flow from manifold plate 40 into a uniform flow as suspension medium S continues through tank T to the discharge end of the tank. This insures that the potato strips entering the feed zone of the tank separate and move expeditiously away from that zone while at the same time sufficient movement and turbulence is produced in the starch medium S to keep the starch in suspension and prevent it from settling out. FIGS. 2 and 10 show the flow through the diffuser plates 40 and 42.

Sedimental starch from suspension S at the base of tank T can be removed through drain 36 and recirculated by pump 34 back to suspension feed manifold 60 above tank T.

The condition of the starch suspension S in tank T is determined by continuously removing a stream of suspension S at outlet 38 and passing through line 47 by pump 51 to specific gravity measuring device 48 and returning to tank T through line 49 to suspension feed manifold 60. Any required adjustments in the specific gravity of suspension S as determined by controller 65 from information obtained by S.G. monitor 48 can then be made in feed manifold 60 by appropriate adjustment of the flow fractions from mixing vessel 50 and water line 62. Any required bacteria inhibitor can also be introduced at manifold 60 through line 63 running from a chlorine dioxide supply.

Since more starch is carried out of the separator on the surface of the potato strips than comes into the separator on the surface, new make up starch must be continually added to maintain the desired specific gravity in the separator. Typically, 100 to 200 gallons of 18 degrees Baumé starch make up (standard density measure for raw starch in water) will be added to the separator per hour for a feed rate of 40,000 pounds per hour of potato strips.

In operation it is desirable to maintain the proper balance between the flow of the medium S and the speed of the conveyor belts 20 and 22 so that the starch will not settle out and yet the suspension will not be characterized by excessive turbulence. In such a solution that is so maintained the low solids potato strips float to the surface while the high solids strips sink to the bottom in a relatively rapid and expeditious manner. To operate otherwise would result in a low solids separation processing rate that would necessitate a much larger tank design or result in excessive sedimentation of the starch medium.

Figure 5:
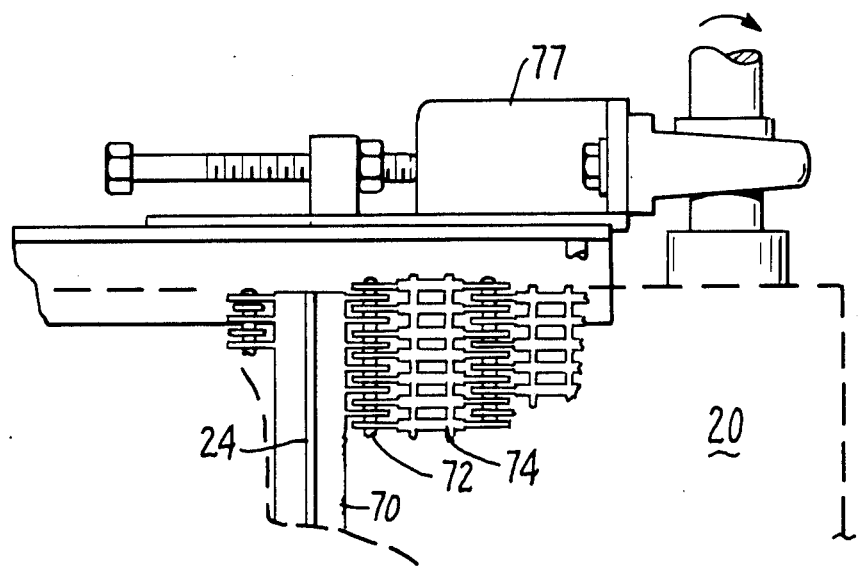
FIG. 5 is a fragmentary top plan view of the discharge end of the lower belt.
Figure 6:
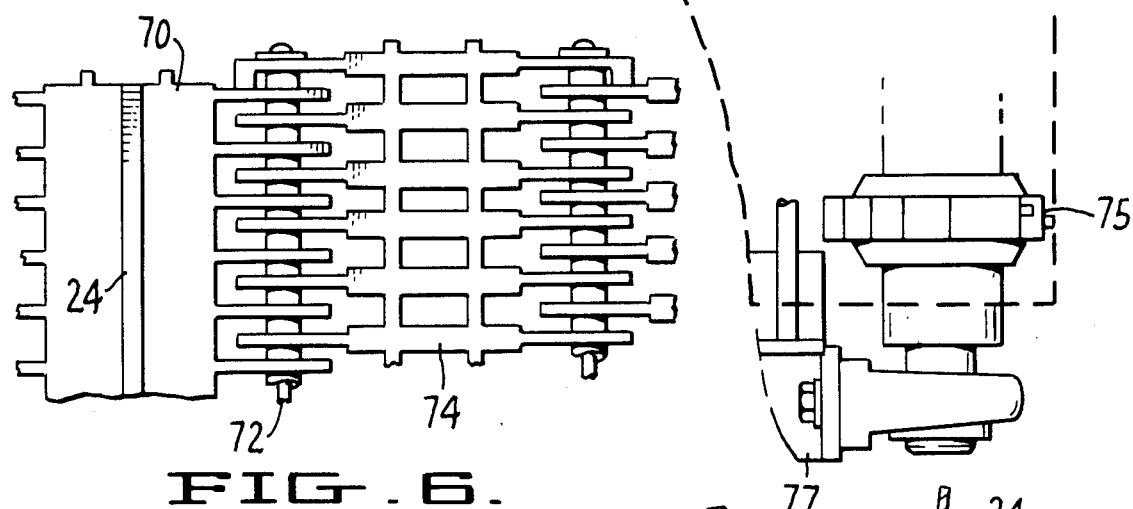
FIG. 6 is a fragmentary portion and top plan of a typical arrangement of the conveyor belt of ths discharge conveyor.
Figure 4:
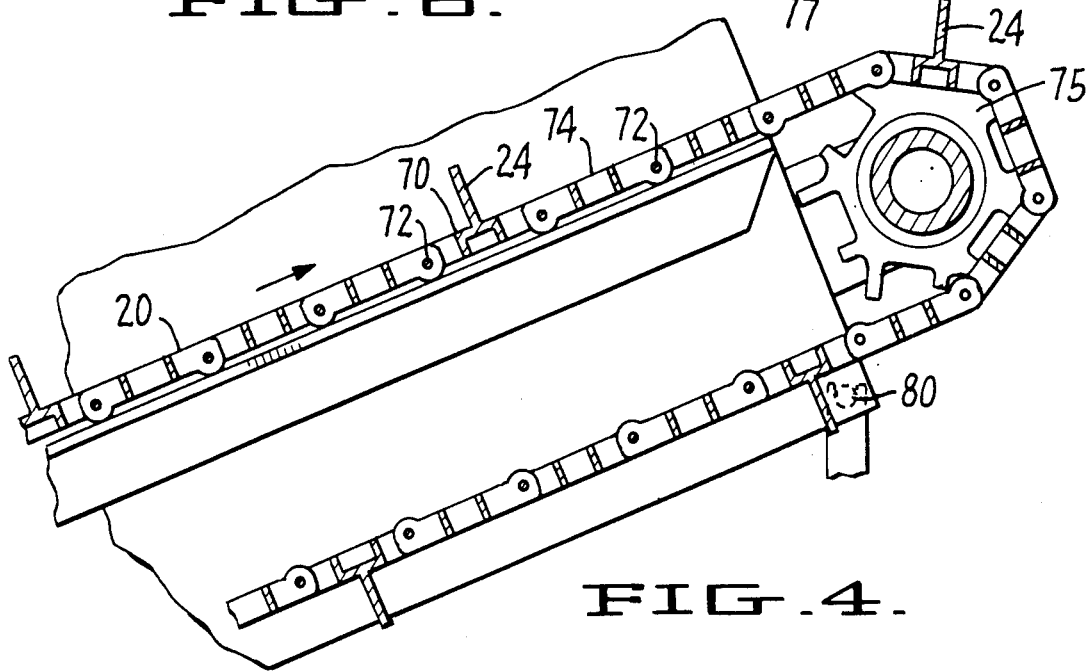
FIG. 4 is a fragmentary view partly in section of the discharge end of the lower conveyor belt.

The open mesh construction of conveyor belts 20 and 22 does not seriously restrict the flow of suspension S through tank T. Any useful design of porous impervious material can be employed. The arrangement shown in FIGS. 4, 5 and 6 is particularly advantageous and utilized strengthened plastic ribbed sections 70 from which flights 24 extend in the case of bottom conveyor 20. Sections 70 are attached in a hinged relation to crosspieces 72 with one or more intermediate sections 74 similarly fastened at spaced intervals about each belt as shown in the drawings.

As heretofore stated, the high solids potato strips, which are desirable for french-fry preparation because of the improved texture of the strip, are picked up at a relatively rapid rate of speed by the lower conveyor belt. Flights 24 on lower conveyor 20 serve as the nesting means and in effect trap the solid strips as they settle towards the bottom of the tank. Similar flights can advantageously be used for the same purpose on the upper conveyor 22. These flights also encourage the flow of the starch suspension S through the system.

Each of the conveyors 20 and 22 may be lifted from the tank by Winches 68 and 69 attached to brackets 66 via chains 67 for cleaning or other servicing as the case may be (FIGS. 1 and 7). When so positioned, servicing of the conveyors 20 and 22 can be readily handled.

A substantially similar arrangement (although the mechanism is not shown in the drawings) may be employed to remove diffuser plates 40 and 42 for servicing or replacement as required (see FIG. 7). It will be noted from FIG. 2 that plate 42 normally fits within vertical brackets 76 which extend from sidewalls 16 of tank T and run to the required depth for properly positioning plate 42. Similar brackets (not shown) can be employed to position radial diffuser plate 40.

In the embodiment used in the present invention the upper and bottom conveyors 22 and 20, respectively, extend for the greater part of the width of the tank with conveyor 20 coming to rest on the bottom sloping wall of tank T, as heretofore mentioned and is designed to maintain conveyor 20 at the proper distance from the tank bottom 11. Each of the conveyors are mounted on pivoted shafts 80 and 81 and have driving sprockets such as 75 as shown in FIG. 4, which engage the mesh conveyors. The tension on conveyors 20 and 22 can be adjusted by any well known take up device shown as 77 in FIG. 5.

Significant and consistent improved results are obtained by the use of this process. Such improvement is realised primarily in the improved texture of the processed potato strips when compared with strips processed by conventional line flow methods wherein no attempt is made to separate high-density and low-density strips.

Comparative results between french fry cut ized as line flow and designated as L.F., and french fry cut strips processed according to the invention utilizing solids separation technique and designated S.S., are set forth in Table I below wherein comparative test results of typical samples of the various forms of strips normally handled in a potato processing plant are reported. The letter designations in Table I below identify particular forms of cut potato strips. Thus, RCC signifies regular crinkle cuts, ADSS designates shoe-string cut potatoes, and DNF designates potato strips cut in the form of Dinner Fries. Each row of comparative test data represents a three-day test run in accordance with the established U.S. Department of Agriculture Standards for Grades of Frozen French Fried Potatoes, including texture grading of potato strips. Each test sample comprised 100 strips and all samples were subjected to the same processing conditions so that the quantity of material and the rate of through-put within the test line were within the U.S. standards for grading of frozen french fry potatoes as published in the Federal Register of Apr. 22, 1966 (31 F.R. 9190) amended Jan. 24, 1967 (32 F.R. 779) and amended and effective Feb. 8, 1967. By such standards, a Grade A score for frozen french fries of between 27 and 30 and for Grade B lies within 24 and 26. The passing score for Food Service potato cuts lies between 70 and 100.

TABLE I

TEXTURE VERSUS BLANCH AND FRY TIME

| Cut-Process (1) | | ANOVA (2) | Regression F/R2 (3) | Regression Equation (4) | Ave. (5) Texture |
|---|---|---|---|---|---|
| RCC | L.F. | — | —/— | 26.5 | 26.3 |
| | S.S. | — | —/— | 28.2 | 27.8 |
| | L.F. | B | B/0.8 | 28.9 | 28.5 |
| | S.S. | — | —/— | 29.3 | 29.1 |
| | L.F. | F × B | —/0.5 | 29.5 | 29.7 |
| | S.S. | — | —/— | 29.8 | 29.8 |
| ADSS | L.F. | F | F2/.13 | 90.0 | 88.5 |
| | S.S. | F,B | F,B,F2/.39 | 90.9 | 87.0 |
| | L.F | F,B, F × B | B,F2,B2/.19 | 89.3 | 88.5 |
| | S.S. | F,B, F × B | B,F2/.12 | 90.8 | 90.7 |
| | L.F. | — | —/— | 89.3 | 88.5 |
| | S.S. | F,B, F × B | F,B2/.13 | 92.0 | 91.5 |
| DNF | L.F. | F,B, F × B | F,B/.10 | 29.2 | 28.9 |
| | S.S. | — | —/— | 29.8 | 29.8 |
| | L.F. | F | F,F2/.25 | 28.6 | 27.6 |
| | S.S. | F,B | F,B/.25 | 29.1 | 28.6 |

(1) L.F. is line flow, S.S. is raw product with low solids removed.
(2) ANOVA determines if fry time (F) or blanch time (B) or their interaction (F × B) has a statistically determined influence on texture.
(3) The F = test determines which terms are significant based on the number of observations and process variables. Significant terms are used to compute a value for R2 which indicates the variation attributable to the included terms. With an R2 of less than .50, the regression equation simply becomes the average value for texture.
(4) This equation expresses the relationship between the dependent variable (in this case texture) and the independent variables of fry time and branch time (in all cases involving texture there is no significant relationship). ADSS was graded for IFS texture only, RCC and DNF were graded for retail texture only.
(5) This expresses the average texture at the lowest fry time (reduced by 60%). Note that in most cases the average texture score at this extreme reduced fry time doesn't vary significantly from the overall texture score.

Column 4 in the table is a summary of the texture comparison for L.F. and S.S. samples for each of 8 three-day runs. The first row shows a Test run for L.F. strips that had a texture score of 26.5, while the same samples when prepared as S.S. strips had a texture score of 28.2. The minimum Grade A texture score for such strips is 27.0, so that it is readily apparent the L.F. materials were out of grade while the S.S. strips were improved by the present invention to not only bring them into grade but to a level well above grade. Not all tests yielded such substantial differences in results, but nevertheless they are consistent and statistically significant in that they show the quality of the S.S. product that is recovered to be of high quality.

Table II below shows the effect of solids separation on raw strips containing sugar problems. "Sugar end" is a condition where a strip will be dark on one end subsequent to frying. "Whole sugar unit" is a condition where the entire strip turns dark. It typically is a small fraction of the number of sugar ends but is a more severe problem because if only one is found, the product is considered out of grade. Solids separation removes a significant fraction of sugar ends (30%-50%) but an even greater fraction of the more severe whole sugar units (80%-90%).

TABLE II

Reduction of Sugar Ends by Solids Separation-Test Run on 12/18/85

| Run No. | Specific Gravity | % low solids removed | % reduction in sugar ends units | % reduction in whole sugar units |
|---|---|---|---|---|
| 1 | 1.060 | 5 | 33 | 88 |
| 2 | 1.068 | 14 | 53 | 80 |

Although mention up to this point has been only made concerning solids separation of potato strips, it is also equally true that this technique of solids separation may be used to separate potato parts of any useable size and shape with differing densities. It is understood then that potato parts of any useful size and shape, including strips, are within the scope of this invention.

I claim:

1. The process of continuously recovering high density french fry cut potato strips of uniform relatively low sugar and moisture content from a random mixture of french fry cut potato strips of varying density, moisture content and sugar content, comprising:

introducing said random mixture of strips of french fry cut potatoes of high and low density into one end of a tank containing a separating medium consisting essentially of a potato starch suspension having a specific gravity less than the specific gravity of said high density cut potatoes, inducing a flow path for said strips through said starch suspension from the introductory end of said tank to the opposite discharge end thereof during which flow said strips of low density french fry cut potatoes within said random mixture rise to the top of said starch suspension and said strips of high density french fry cut potatoes settle to the lower region of said starch suspension, separately removing each of said low density potato strips and said high density potato strips from said starch suspension so that said high density strips are recovered for further processing as high quality french fry strips of uniform texture and said low density strips are recovered for use in other products, removing said starch suspension at the discharge end of the tank, and returning said discharged starch suspension to the introductory end of said tank along with required makeup potato starch in a manner wherein said starch suspension is radially diffused and caused to flow through said tank at uniform nonturbulent rates throughout said tank.

2. The process of claim 1 wherein the high density strips which settle in the lower regions of said suspension are removed from the tank at more rapid rates than the low density fraction recovered from the upper zone thereof.

3. The process of claim 1 wherein the specific gravity of said starch suspension is within the range of 1.040 to 1.090.

4. The process of claim 3 wherein the specific gravity of said starch suspension is adjusted by continuously withdrawing and monitoring a sample of said starch suspension from the separation zone in said tank and subsequently adding water or potato starch as indicated by the specific gravity of said samples.

5. The process of claim 1 wherein said tank in which said process is carried out is of dimensions that accommodate a quantity of said starch suspension sufficient to provide a receiving zone into which said random mixture of cut potato strips are fed, a separation zone through which said high density potato strips settle toward the bottom of said tank and wherein said low density potato strips float near the top thereof and separately discharging said high density and said low density potatoes.

6. The process of claim 1 wherein said starch suspension is made of raw potato starch recovered from potato cutting and processing operations.

* * * * *